June 5, 1928.
S. J. BENNER
1,672,799
UNIVERSAL CONVEYER AND CHAIN THEREFOR
Filed July 26, 1927
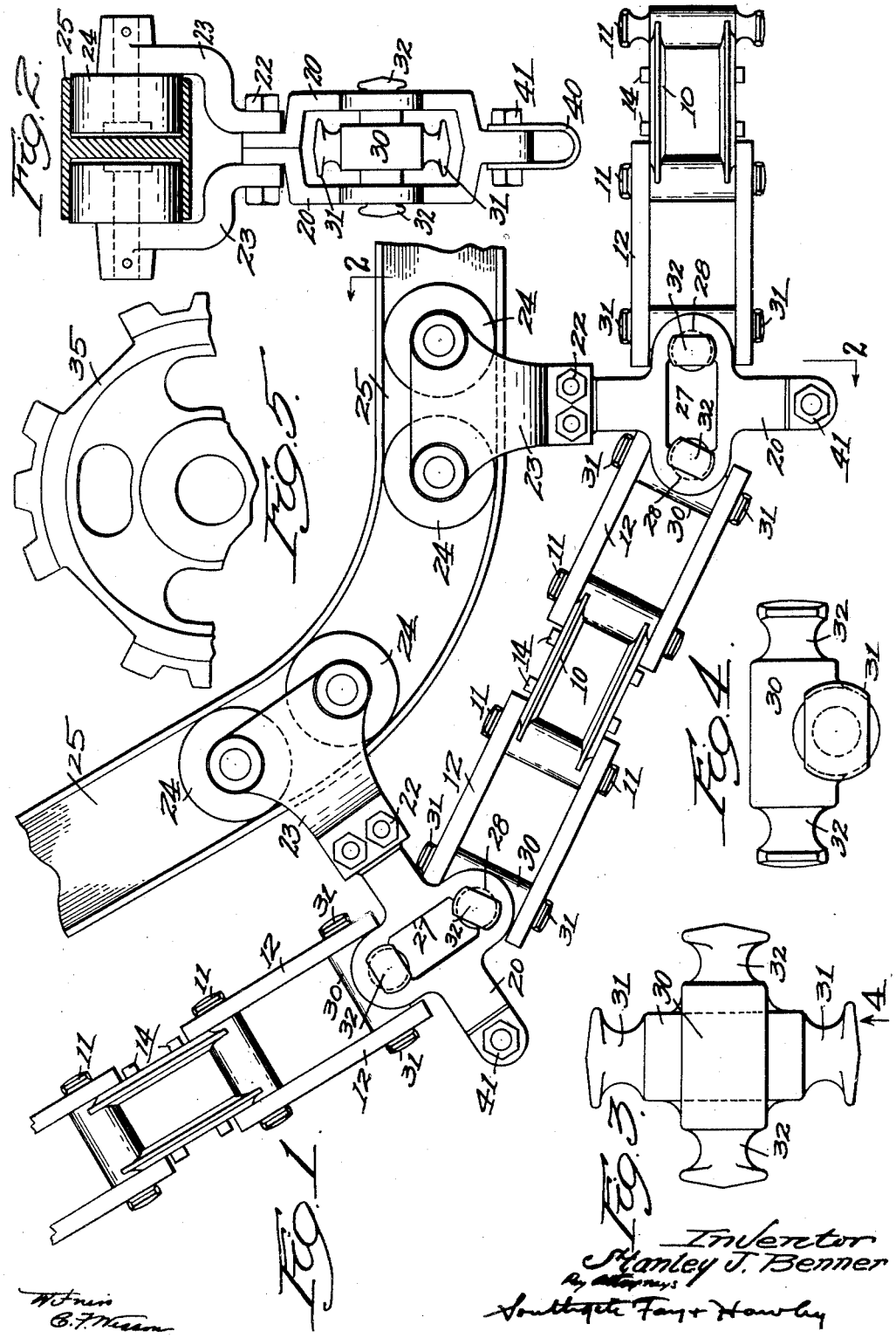
Inventor
Stanley J. Benner Patented June 5, 1928.

1,672,799

UNITED STATES PATENT OFFICE.

STANLEY J. BENNER, OF HAZLETON, PENNSYLVANIA, ASSIGNOR TO MOORE DROP FORGING COMPANY, OF SPRINGFIELD, MASSACHUSETTS, A CORPORATION OF MASSACHUSETTS.

UNIVERSAL CONVEYER AND CHAIN THEREFOR.

Application filed July 26, 1927. Serial No. 208,592.

This invention relates to a conveyer for transporting factory products or other similar purposes. In its general construction, my improved conveyer comprises a chain having universal joint devices provided at regular intervals therein to permit movement of different portions of the chain relative to each other in two different directions. The universal joint devices are commonly provided with extensions having guide-rolls thereon by which the chain may be guided and supported.

It is the general object of my invention to improve the construction of such universal conveyers as heretofore used and to produce a conveyer of increased utility and great flexibility.

Another object is to provide a universal conveyer chain which may be very easily assembled or separated and which may be easily converted into a straight line conveyer chain when the universal action is not desired.

A still further object is to provide a universal conveyer chain which may be driven by a sprocket having a single row of teeth thereon instead of involving the increased expense of using a double sprocket.

My invention further relates to arrangements and combinations of parts which will be hereinafter set forth and more particularly pointed out in the appended claims.

A preferred form of the invention is shown in the drawings in which

Fig. 1 is a side view of my improved conveyer chain;

Fig. 2 is a sectional elevation, taken along the line 2—2 in Fig. 1;

Fig. 3 is a side elevation of one of the pivot members;

Fig. 4 is an end view thereof, looking in the direction of the arrow 4 in Fig. 3; and Fig. 5 is a partial side elevation of a sprocket wheel adapted for use with my improved chain.

Referring to Fig. 1, I have shown a portion of my improved chain comprising short sections of regular chain pivotally connected by my improved universal joint devices. The regular chain comprises blocks 10 having lugs 11 projecting on each side at each end thereof, and side links 12 pivotally connected to said lugs 11.

The links 12 are preferably slotted lengthwise to receive the lugs 11 when the links are turned at right angles to the blocks 10, and the blocks 10 are provided with projections 14 limiting longitudinal movement of the links 12 when in working position.

My improved universal joint device comprises side plates 20 (Fig. 2) secured at their upper ends by bolts 22 to trolley frame members 23 having guide-rolls or trolley wheels 24 supported thereon. The rolls 24 are adapted to travel between the flanges of an I-beam 25 or other guiding and supporting structure. The side plates 20 are provided with slots or openings 27 (Fig. 1) having reduced end bearing portions 28.

Pivot members 30 (Figs. 3 and 4) are each provided with a pair of pivot portions or lugs 31 and with an additional pair of pivot portions or lugs 32. The axis of the lugs 31 is perpendicular to the axis of the lugs 32 and crosses closely adjacent thereto, as shown in Fig. 4.

Each lug 31 and 32 is provided with a head which is reduced in diameter in one direction, as clearly shown in Fig. 4. The heads of the lugs 32 may be inserted through the openings 27 in the side plates 20 before the plates are assembled and may then be moved endwise and seated in the bearing portions 28. The pivot members 30 may then be inserted between the usual side links 12 by turning said links so that the shorter dimensions of the heads 31 are transverse to the slotted openings in the side links 12. When the links are thereafter turned to normal position, the longer dimensions of the heads 31 will extend across the slots in the links and will prevent displacement thereof.

It will thus appear that my improved universal joint devices may be first assembled as separate units and may then be inserted in a chain without the use of tools, so that a chain of any desired length may be quickly and easily built up.

It will also be noted that the distance between the center points of the axes of the lugs 31, when the two pivot members are in operative position in a chain, is the same as the distance between the axes of the pivots of the blocks 10 or the side links 12. Consequently a regular straight chain may be quickly and easily converted to a universal chain or vice versa, as the side links and universal joint devices are interchangeable.

It is necessary, as indicated in Fig. 5, to omit certain teeth on the sprocket 35 to provide space for the universal joint devices, but the chain will run on sprockets having a single row of teeth, which is an important advantage.

Any suitable device such as a U-shaped member 40 (Fig. 2) may be secured to each universal joint device as by a bolt 41, for supporting any desired load, the form of the supporting devices and the means of attachment being varied to suit operative conditions.

Having described my invention and the advantages thereof, I do not wish to be limited to the details herein disclosed otherwise than as set forth in the claims, but

What I claim is:—

1. In a conveyer chain having side links, a universal joint device comprising a pair of spaced parallel side plates having a bearing extension and guide rolls mounted thereon, and cross-shaped pivot members mounted between said plates, each pivot member having portions pivoted in and between said side plates to turn on an axis perpendicular to said side plates, and each member having additional pivot portions disposed on an axis perpendicular to said first axis and on which said side links are pivoted.

2. In a conveyer chain having side links, a universal joint device comprising spaced parallel side plates having a bearing extension and guide rolls mounted thereon, and a pair of cross-shaped pivot members having pivot portions to which said side links are connected, said first-mentioned pivot portions and said additional pivot portions having their axes perpendicular to each other.

3. In a conveyer chain having side links, a universal joint device comprising spaced parallel plates having a bearing extension and guide rolls mounted thereon, and pivot members having pivot portions engaged in said plates and having additional pivot portions to which said side links are connected, said two sets of pivot portions having their axes closely adjacent and perpendicular to each other.

4. A conveyer chain comprising universal joint devices having bearing extensions and guide rolls mounted thereon, and flexible connecting members between said devices, said universal joint devices each having swivel connections to the adjacent ends of two of said flexible connecting members, permitting movement of said joint device relative thereto in two directions perpendicular to each other, and each universal joint device comprising side plates having elongated bearing openings therein enlarged at their middle portions and reduced at their end portions, and said swivel connections comprising cross-shaped pivot members having enlarged heads adapted to pass through said middle portions and to be seated in said reduced end portions when said pivot members are in normal working position.

5. In a chain structure including blocks and side links, a universal joint device comprising slotted side plates having a bearing extension and guide rolls mounted thereon, and pivot members having lugs engaged in the side links and additional lugs disposed at right angles to said first lugs, and engaged in the slots of side plates.

6. In a chain structure including side links, a universal joint device occupying a longitudinal space substantially equivalent to that of one side link and comprising two side plates having a bearing extension and guide rolls mounted thereon, and two pivot members, said pivot members having two lateral lugs engaged with said side plates, and having two additional lugs disposed perpendicular to said first lugs and engaged with adjacent side links.

7. In a chain structure including removable side links, universal joint devices positioned at regularly spaced intervals between said side links in the chain, each of said joint devices comprising side plates having a bearing extension and guide rolls mounted thereon, and two pivot members each disposed between corresponding ends of a pair of side links and each having pivot lugs engaged with said side links, said pivot members having additional lugs perpendicular to said first lugs and pivotally engaged with and between said side plates, the axes of said additional lugs being positioned closer together than the axes of said first-mentioned lugs when in working position, in which position the axes of said first-mentioned lugs, when perpendicular to said side plates, are spaced apart a distance substantially equal to the effective length of one side link.

In testimony whereof I have hereunto affixed my signature.

STANLEY J. BENNER.